US012048655B2

(12) United States Patent
Bleakney et al.

(10) Patent No.: US 12,048,655 B2
(45) Date of Patent: Jul. 30, 2024

(54) LOW-PROFILE AND HIGH-LOAD BALL-BALANCING ROLLING SYSTEM

(71) Applicant: The Board of Trustees of the University of Illinois, Urbana, IL (US)

(72) Inventors: Adam Wade Bleakney, Savoy, IL (US); Jeannette R. Elliott, Dewey, IL (US); Elizabeth T. Hsiao-Wecksler, Urbana, IL (US); Patricia Barrett Malik, Tremont, IL (US); Deana C. McDonagh, Champaign, IL (US); Arielle K. Rausin, Urbana, IL (US); William Robert Norris, Champaign, IL (US); Joao Luiz Almeida de Souza Ramos, Champaign, IL (US); Yu Chen, Urbana, IL (US); Chenzhang Xiao, Champaign, IL (US); Yinan Pei, Urbana, IL (US); Seung Yun Song, Urbana, IL (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 74 days.

(21) Appl. No.: 17/464,446

(22) Filed: Sep. 1, 2021

(65) Prior Publication Data
US 2022/0062075 A1 Mar. 3, 2022

Related U.S. Application Data

(60) Provisional application No. 63/074,126, filed on Sep. 3, 2020.

(51) Int. Cl.
*B60B 19/14* (2006.01)
*A61G 5/04* (2013.01)
(Continued)

(52) U.S. Cl.
CPC ........... *A61G 5/041* (2013.01); *A61G 5/1056* (2013.01); *B60B 19/14* (2013.01); *B62K 11/007* (2016.11); *A61G 2203/70* (2013.01)

(58) Field of Classification Search
CPC .. A61G 5/041; A61G 5/1056; A61G 2203/70; B62K 11/007; B60B 19/14
(Continued)

(56) References Cited

U.S. PATENT DOCUMENTS

| 3,138,402 A | 6/1964 | Heyl et al. |
| 3,215,469 A | 11/1965 | Wamsley |

(Continued)

FOREIGN PATENT DOCUMENTS

| CN | 104390645 A | 3/2015 |
| CN | 105662743 A | 6/2016 |
| CN | 107450556 A | 12/2017 |

OTHER PUBLICATIONS

World Health Organization, "Fact sheet on wheelchairs," 2010. [Online]. Available: https://apps.who.int/iris/bitstream/handle/10665/205041/84616.pdf: 4 pages.

(Continued)

*Primary Examiner* — James A Shriver, II
*Assistant Examiner* — Hilary L Johns
(74) *Attorney, Agent, or Firm* — Crowell & Moring LLP

(57) ABSTRACT

This disclosure describes a low-profile, high-load, and hands-free ball-balancing omnidirectional rolling system with multiple human-robot interfaces for modular and adaptive design configurations and input control interfaces. The disclosed platform uses a self-balancing ball-based robot to allow for a safe, compact, high-load, self-balancing and intuitive mobility device for a person with lower-limb dis-
(Continued)

ability. Advanced driving assistance such as obstacle avoidance and semi-autonomous navigation between predefined locations is also disclosed.

19 Claims, 10 Drawing Sheets

(51) Int. Cl.
    *A61G 5/10* (2006.01)
    *B62K 11/00* (2006.01)
(58) Field of Classification Search
    USPC .......................................................... 180/21
    See application file for complete search history.

(56) References Cited

U.S. PATENT DOCUMENTS

| | | | | |
|---|---|---|---|---|
| 4,413,693 | A * | 11/1983 | Derby | A61G 5/043 |
| | | | | 180/343 |
| 6,842,692 | B2 | 1/2005 | Fehr et al. | |
| 7,080,710 | B2 | 7/2006 | Kwon et al. | |
| 7,243,746 | B1 * | 7/2007 | Vasant | B62D 11/04 |
| | | | | 180/21 |
| 7,748,490 | B2 | 7/2010 | Hornick et al. | |
| 7,847,504 | B2 | 12/2010 | Hollis | |
| 7,895,135 | B2 | 2/2011 | Norris et al. | |
| 8,028,775 | B2 | 10/2011 | Orenbuch | |
| 8,195,364 | B2 | 6/2012 | Norris et al. | |
| 8,340,869 | B2 * | 12/2012 | Wakita | A61G 5/04 |
| | | | | 701/99 |
| 8,459,383 | B1 * | 6/2013 | Burget | B60B 19/003 |
| | | | | 180/7.1 |
| 8,498,796 | B2 | 7/2013 | Norris et al. | |
| 8,604,709 | B2 * | 12/2013 | Jalbout | H05B 45/10 |
| | | | | 315/307 |
| 8,676,420 | B2 | 3/2014 | Kume et al. | |
| 8,864,609 | B2 * | 10/2014 | Kodama | A63B 43/06 |
| | | | | 473/570 |
| 9,085,080 | B2 | 7/2015 | Mian | |
| 9,216,745 | B2 | 12/2015 | Beardsley et al. | |
| 9,427,649 | B2 * | 8/2016 | Teevens | A63B 69/34 |
| 9,480,618 | B2 | 11/2016 | Hsiao-Wecksler et al. | |
| 9,663,106 | B1 * | 5/2017 | Almutairi | B62D 9/00 |
| 9,931,254 | B2 * | 4/2018 | Halsall | A61G 5/128 |
| 10,189,342 | B2 * | 1/2019 | Bewley | B60K 1/02 |
| 10,968,966 | B2 * | 4/2021 | Carbone | B60B 19/14 |
| 11,040,746 | B2 * | 6/2021 | Waita | B60K 7/0007 |
| 11,399,995 | B2 * | 8/2022 | Coulter | A61G 5/063 |
| 2004/0182614 | A1 * | 9/2004 | Wakui | G06N 3/008 |
| | | | | 180/7.1 |
| 2008/0283311 | A1 * | 11/2008 | Li | B60K 1/02 |
| | | | | 903/902 |
| 2010/0114468 | A1 * | 5/2010 | Field | B62J 17/08 |
| | | | | 701/124 |
| 2011/0112447 | A1 | 5/2011 | Hsiao-Wecksler et al. | |
| 2015/0008051 | A1 * | 1/2015 | Halsall | A61G 5/043 |
| | | | | 180/6.6 |
| 2017/0095383 | A1 | 4/2017 | Li et al. | |
| 2018/0022197 | A1 * | 1/2018 | Bewley | B60B 19/14 |
| | | | | 180/21 |
| 2019/0144036 | A1 * | 5/2019 | Geiger | B62D 11/003 |
| | | | | 180/6.5 |
| 2019/0145471 | A1 * | 5/2019 | Carbone | F16D 49/10 |
| | | | | 180/210 |
| 2021/0001710 | A1 * | 1/2021 | Wowerat | B60B 19/14 |

OTHER PUBLICATIONS

M. W. Brault, "Americans with disabilities: 2010," Report Number P70-131; US Department of Commerce, Economics and Statistics Administration, Jul. 2012; 6 pages.

H. S. Kaye, T. Kang, and M. P. LaPlante, "Mobility Device Use in the United States. Disability Statistics Report," Report 14; National Institute on Disability and Rehabilitation Research, Jun. 2000; 60 pages.
"Segway S-Pod (Concept) | Segway," Segway. [Online]. Available: https://www.segway.com/seqgway-s-pod. [Accessed Feb. 24, 2020]; 4 pages.
"The Freee F2—Freee F2," FREEE, Oct. 15, 2019. [Online]. Available: https://www.freee.de/en/product/the-freee-f2.html. [Accessed: Feb. 24, 2020]; 1 page.
Argyros et al. "Semi-autonomous Navigation of a Robotic Wheelchair," Journal of Intelligent and Robotic Systems 34; 2002; 15 pages.
Dinh Ba et al. "Balancing and Translation Control of a Ball Segway That a Human Can Ride," 16th International Conference on Control, Oct. 16-19, 2016, 4 pages.
Demeester et al. "User-adapted plan recognition and user-adapted shared control: A Bayesian approach to semi-autonomous wheelchair driving," Springer Science+Business Media, Dec. 2007, 19 pages.
Demeester et al. "A Model-based, Probabilistic Framework for Plan Recognition in Shared Wheelchair Control: Experiments and Evaluation," Department of Mechanical Engineering, Katholieke Universiteit Leuven, Oct. 2003, 6 pages. Durrant-Whyte et al. Simultaneous Localization and Mapping: Part I.
Durrant-Whyte et al. "Simultaneous Localization and Mapping: Part I," IEEE Robotics & Automation Magazine, Jun. 2006, 10 pages.
Elfes, Alberto, "Using Occupancy Grids for Mobile Robot Perception and Navigation," Computer, vol. 22, No. 6, Jun. 1989, 12 pages.
Endo et al. "An Omnidirectional Vehicle on a Basketball," Department of Mechano Informatics, University of Tokyo, Japan, 2005, 6 pages.
Fankhauser et al. "Modeling and Control of a Ballbot," ETHZurich, Spring 2010, 101 pages.
Hoshino et al. "OmniRide: A Personal Vehicle with 3 DOF Mobility," International Conference on Control, Automation, Robotics and Embedded System, 2013 *International Conference on Control, Automation, Robotics and Embedded Systems* (CARE), 2013, pp. 1-6.
Hart et al. "A Formal Basis for the Heuristic Determination of Minimum Cost Paths," IEEE Transactions on Systems on Science and Cybernetics, Jul. 1968, 8 pages.
Hertig et al. "Unified State Estimation for a Ballbot," IEEE International Conference on Robotics and Automation, May 2013, 6 pages.
Johnson et al. "Minimizing Driver Interference Under a Probablistic Safety Constraint in Emergency Collision Avoidance Systems," 15th International IEEE Conference on Intelligent Transportation Systems, 2012, 6 pages.
Katevas et al. "The Autonomous Mobile Robot Senario: A Sensor-Aided Intelligent Navigation System for Powered Wheelchairs," IEEE Robotics & Automation Magazine, Dec. 1997, 11 pages.
Khatib, Oussama, "Real-Time Obstacle Avoidance for Manipulators and Mobile Robots," The International Journal of Robotics Research, vol. 5, No. 1, Mar. 1986, 9 pages.
Kumaga et al. "Development of a Robot Balanced on a Ball: Application of passive motion to transport," IEEE International Conference on Robotics and Automation. May 2009, 6 pages.
Kumagai et al. "Development of a Robot Balancing on a Ball," International Conference on Control, Automation and Systems, Oct. 2008, 6 pages.
Kumagai et al. "Development of a Three-Dimensional Ball Rotation Sensing System using Optical Mouse Sensors," IEEE International Conference on Robotics and Automation, May 2011, 6 pages.
Lauwers et al. "One is Enough!" The Robotics Institute, Carnegie Mellon University, 2007, 10 pages.
Lunsford et al. "Innovations With 3-Dimensional Printing in Physical Medicine and Rehabilitation: A Review of the Literature," Narrative Review, 2016, 12 pages.
Morrow et al. "Detailed Shoulder MRI Findings in Manual Wheelchair Users with Shoulder Pain," Hindawi Publishing Corporation BioMed Research International, vol. 2014, 8 pages.

(56) References Cited

OTHER PUBLICATIONS

Nagarajan et al. "The ballbot: An omnidirectional balancing mobile robot," The International Journal of Robotics Research, vol. 33, 2013, 14 pages.

Nagarajan et al. "State Transition, Balancing, Station Keeping, and Yaw Control for a Dynamically Stable Single Spherical Wheel Mobile Robot," IEEE International Conference on Robotics and Automation, May 2009, 6 pages.

Nagarajan et al. "Hybrid Control for Navigation of Shape-Accelerated Underactuated Balancing Systems," 49th IEEE Conference on Decision and Control (CDC), Dec. 2010, 6 pages.

Nguyen et al. "Segway Robotic Mobility Platform," Mobile Robots XVII, vol. 5609, Dec. 2004, 14 pages.

Norris et al. "A Novel Approach Using a Neural Network Based Adaptive Filter for Performing Real-Time, On-line Qualitative System Design," Automation Technology for Off-Road Equipment Proceedings of the 2002 Conference. American Society of Agricultural and Biological Engineers, 2002, 9 pages.

Norris et al. "A Design Tool for Operator-Adaptive Steering Controllers," Transactions of the ASAE 46.3, 2003, 10 pages.

Ojeda et al. "Temporal Parameters Estimation for Wheelchair Propulsion Using Wearable Sensors," BioMed research international, 2014, 11 pages.

Park et al. "Obstacle voidance of autonomous vehicles based on model predictive control," Proceedings of the Institution of Mechanical Engineers, Part D: Journal of Automobile Engineering 223.12, 2009, 18 pages.

Pham et al. "Balancing and Transferring Control of a Ball Segway Using a Double-Loop Approach," IEEE Control Systems Magazine 38.2, 2018, 23 pages.

Ranasinghe et al. "Development of a Lightweight, Low-cost, Self-balancing Personal Mobility Vehicle for Autonomous Indoor Navigation," IEEE/ASME International Conference on Advanced Intelligent Mechatronics (AIM), Jul. 2019, 6 pages.

Ruan et al. "Ultrasonic Sensor Based Two-wheeled Self-balancing Robot Obstacle Avoidance Control System," IEEE International Conference on Mechatronics and Automation, Aug. 2014, 5 pages.

Rushton et al. "The potential impact of intelligent power wheelchair use on social participation: perspectives of users, caregivers and clinicians," Disability and Rehabilitation: Assistive Technology, vol. 10, No. 3, 2015, 8 pages.

Seki et al. "Autonomous/Semi-autonomous Navigation System of a Wheelchair by Active Ultrasonic Beacons," Proceedings 2000 ICRA. Millennium Conference, IEEE International Conference on Robotics and Automation. Symposia Proceedings (Cat. No. 00CH37065), vol. 2., Apr. 2000, 6 pages.

Seyfarth et al. "Initial Results for a Ballbot Driven with a Spherical Induction Motor," 2016 IEEE International Conference on Robotics and Automation (ICRA), May 2016, 6 pages.

Shomin et al. "Fast, Dynamic Trajectory Planning for a Dynamically Stable Mobile Robot," 2014 IEEE/RSJ International Conference on Intelligent Robots and Systems, Sep. 2014, 6 pages.

Takei et al. "Baggage Transportation and Navigation by a Wheeled Inverted Pendulum Mobile Robot," IEEE Transactions on Industrial Electronics, vol. 56, No. 10, Jul. 2009, 10 pages.

Vanhooydonck et al. "Shared Control for Intelligent Wheelchairs: an Implicit Estimation of the User Intention," Proceedings of the 1st international workshop on advances in service robotics (ASER'03), Mar. 2003, 8 pages.

Ye et al. "Vision-Based Human Tracking Control of a Wheeled Inverted Pendulum Robot," IEEE transactions on cybernetics, vol. 46, No. 11, Oct. 2015, 12 pages.

Alexander et al. "Department of Pure and Applied Zoology, University of Leeds, Leeds LS2 9JT," Journal of zoology 201.1, 1983, 18 pages.

Aljure et al. "Carpal Tunnel Syndrome Paraplegic Patients" Spinal Cord, 23.3, 1985, 5 pages.

Small Cabin, "Average Room Size," 2022 [online]. Available: https://www.small-cabin.com/forum/, 7 pages.

Back et al. "Modeling and Control System Design of a Ball Segway," 2016 16th International Conference on Control, Automation and Systems (ICCAS). IEEE, 2016, 3 pages.

Ballinger et al. "The Relation of Shoulder Pain and Range-of-Motion Problems to Functional Limitations, Disability, and Perceived Health of Men With Spinal Cord Injury: A Multifaceted Longitudinal Study," Archives of physical medicine and rehabilitation 81.12, 2000, 7 pages.

Blitzer, Leon, "Inverted Pendulum," American Journal of Physics, 33.12, 1965, 4 pages.

"Blumil i2—Experience freedom of riding," Blumil. [Online]. Available: https://blumil.com/blumil-i2. [Accessed: Feb. 24, 2020].

Boehm, Barry W. "A Spiral Model of Software Development and Enhancement," Computer 21.5,1988, 12 pages.

Boes et al. "Six-Minute Walk Test Performance in Persons With Multiple Sclerosis While Using Passive or Powered Ankle-Foot Orthoses," Archives of physical medicine and rehabilitation, Mar. 2018, 7 pages.

Boes et al. "Fuel Efficiency of a Portable Powered Ankle-Foot Orthosis," 2013 IEEE 13th International Conference on Rehabilitation Robotics (ICORR), Jun. 2013, 6 pages.

Brault, Matthew W. "Current Population Reports: Americans with Disabilities. 2005." Washington, DC: US Department of Commerce, Economics and Statistics Administration, US Census Bureau, 2008, 24 pages.

Chan et al. "Review of modelling and control of two-wheeled robots," Annual reviews in control, 37.1, Apr. 2013, 15 pages.

Chin et al. "A pneumatic power harvesting ankle-foot orthosis to prevent foot-drop," Journal of neuroengineering and rehabilitation 6.1, Dec. 2009, 11 pages.

Chin et al. "Fluid-Power Harvesting by Under-Foot Bellows During Human Gait," 2012, 7 pages.

Couéet al. "Bayesian Occupancy Filtering for Multitarget Tracking: An Automotive Application," The International Journal of Robotics Research, 25.1, Jun. 2006, 12 pages.

DiBerardino III et al., "Improving Regions of Deviation Gait Symmetry Analysis With Pointwise t Tests," Journal of applied biomechanics, 28.2, May 2012, 5 pages.

Durfee et al., "Tiny Hydraulics for Powered Orthotics," 2011 IEEE International Conference on Rehabilitation Robotics. IEEE, Jun. 2011, 6 pages.

Fang et al. "Anthropometric and biomechanical characteristics of body segments in persons with spinal cord injury," Journal of biomechanics, Apr. 2017, 7 pages.

Forsberg et al. "The relationship of system engineering to the project cycle, " INCOSE international symposium, vol. 1. No. 1,1991, 11 pages.

"The Freee F2—Freee F2," FREEE, Oct. 15, 2019. [Online]. Available: https://www.freee.de/en/product/the-freee-f2.html. [Accessed: Feb. 24, 2020].

Fulgenzi et al. "Dynamic Obstacle Avoidance in uncertain environment combining PVOs and Occupancy Grid," Proceedings 2007 IEEE International Conference on Robotics and Automation. IEEE, Apr. 2007, 7 pages.

Gellman et al. "Carpal tunnel syndrome in paraplegic patients." JBJS 70.4, Apr. 1988, 3 pages.

Giesbrecht et al. "Safeguarding Autonomy Through Intelligent Shared Control," Unmanned Systems Technology XIX. vol. 10195. SPIE, May 2017, 15 pages.

Hong et al. "Mobile Robot Navigation using Modified Flexible Vector Field Approach with Laser Range Finder and IR sensor," 2007 International Conference on Control, Automation and Systems. IEEE, Oct. 2007, 6 pages.

Hoshino et al. "Design and implementation of a personal mobility of single spherical drive," Journal of Physics: Conference Series. Vol. 744. No. 1. IOP Publishing, 2016, 13 pages.

Irani et al. "Recovery of ego-motion using image stabilization," 1994 Proceedings of IEEE Conference on Computer Vision and Pattern Recognition. IEEE, 1994, 23 pages.

Islam et al. "Detection of Gait Modes Using an Artificial Neural Network during Walking with a Powered Ankle-Foot Orthosis," Journal of Biophysics 2016, 2016, 9 pages.

(56) References Cited

OTHER PUBLICATIONS

Islam et al. "Developing a Classification Algorithm for Plantarflexor Actuation Timing of a Powered Ankle-Foot Orthosis," Journal of Medical Devices, 10.3 Sep. 2016, 2 pages.
Islam et al. "Gait State Estimation for a Powered Ankle Orthosis Using Modified Fractional Timing and Artificial Neural Network," Journal of Medical Devices,s 10.2 Jun. 2016, 2 pages.
Jackal UGV [online], Available: https://clearpathrobotics.com/jackal-small- unmanned-ground-vehicle, 8 pages.
Kim et al. "Nonlinear Model Predictive Tracking Control for Rotorcraft-based Unmanned Aerial Vehicles," Proceedings of the 2002 American control conference (IEEE Cat. No. CH37301), vol. 5. IEEE, May 2002, 6 pages.
Kumaran et al. "Increasing Quality and Involvement in Online Peer Feedback Exchange," Proceedings of the ACM on Human-Computer Interaction 1.CSCW Dec. 2017, 18 pages.
Kwakernaak et al. Linear optimal control systems. vol. 1. New York: Wiley-interscience, 1972, 2 pages.
Larson et al. "Off-Road Terrain Traversability Analysis and Hazard Avoidance for UGVs," IEEE intelligent vehicles symposium, Oct. 2011, 7 pages.
Lauwers et al. "A Dynamically Stable Single-Wheeled Mobile Robot with Inverse Mouse-Ball Drive," Proceedings 2006 IEEE International Conference on Robotics and Automation, 2006. ICRA 2006 .. IEEE, May 2006, 6 pages.
Li et al. "Simulation and Experimental Analysis of a Portable Powered Ankle- Foot Orthosis Control," Dynamic Systems and Control Conference, vol. 54754, Jan. 2011, 8 pages.
Li et al. "Gait Mode Recognition Using an Inertial Measurement Unit to Control an Ankle-Foot Orthosis During Stair Ascent and Descent," Dynamic Systems and Control Conference, vol. 45295. American Society of Mechanical Engineers, Oct. 2012, 11 pages.
Li et al. "Estimating System State During Human Walking With a Powered Ankle- Foot Orthosis," IEEE/ASME Transactions on Mechatronics, 16.5, Oct. 2011, 10 pages.
Li et al. "Gait Mode Recognition and Control for a Portable-Powered Ankle-Foot Orthosis," 2013 IEEE 13th International Conference on Rehabilitation Robotics (ICORR). IEEE, Jun. 2013, 8 pages.
Minniti et al. "Whole-Body MPC for a Dynamically Stable Mobile Manipulator," IEEE Robotics and Automation Letters, 4.4, Jul. 2019, 8 pages.
Mitchell, Richard. "Stability of the inverted pendulum subjected to almost periodic and stochastic base motion—an application of the method of averaging." International Journal of Non-Linear Mechanics, 7.1, Feb. 1972, 23 pages.
Mohler et al. "Visual flow influences gait transition speed and preferred walking speed," Experimental brain research 181, Aug. 2007, 8 pages.
Mori et al. "Control of unstable mechanical system Control of pendulum," International Journal of Control, 23.5, May 1976, 21 pages.
Morris et al. "Actuation timing strategies for a portable powered ankle foot orthosis," Dynamic Systems and Control Conference. vol. 54761, Jan. 2011, 8 pages.
Nawawi et al. "Controller Design for Two-wheels Inverted Pendulum Mobile Robot Using PISMC," 2006 4th Student Conference on Research and Development. IEEE, Jun. 2006, 6 pages.
Nagarajan et al. "Trajectory Planning and Control of an Underactuated Dynamically Stable Single Spherical Wheeled Mobile Robot," 2009 IEEE International Conference on Robotics and Automation. IEEE, May 2009, 6 pages.
Pentland et al. "The Weight-bearing Upper Extremity Women with Long Term Paraplegia," Spinal Cord, 29.8, Oct. 1991, 10 pages.

Petrucci et al. "Modulation of anticipatory postural adjustments using a powered ankle orthosis in people with Parkinson's disease and freezing of gait," Gait & posture 72, Jul. 2019, 7 pages.
Petrucci et al. "Modulation of Anticipatory Postural Adjustments of Gait Using a Portable Powered Ankle-Foot Orthosis," 2013 IEEE International Conference on Rehabilitation Robotics, Jun. 2013, 6 pages.
Petrucci et al. "A Neuromechanical Model of Reduced Dorsiflexor Torque During the Anticipatory Postural Adjustments of Gait Initiation," IEEE Transactions on Neural Systems and Rehabilitation Engineering, 26.11, 2018, 7 pages.
Phelps III et al. "An Analytical Solution of the Inverted Pendulum," American Journal of Physics, 33.4, 1965, 12 pages.
Saleem et al. "An Integration Framework for UGV Outdoor Navigation System Based on LiDAR and Vision Data," 2015 16th International Conference on Research and Education in Mechatronics (REM). IEEE, Nov. 2015, 7 pages.
Schepelmann et al. "Development of a Testbed for Robotic Neuromuscular Controllers," Robotics: Science and Systems VIII 4, Jan. 2012, 8 pages.
Shim et al. "A flight control system for aerial robots: Algorithms and experiments." IFAC Proceedings vol. 35.1, Jan. 2002, 6 pages.
Shorter et al. "Technologies for Powered Ankle-Foot Orthotic Systems: Possibilities and Challenges," IEEE/ASME Transactions on mechatronics, 18.1, Dec. 2011, 11 pages.
Shorter et al. "A portable powered ankle-foot orthosis for rehabilitation," J. Rehabil. Res. Dev, 48.4, Nov. 2011, 14 pages.
Shorter et al. "Experimental Evaluation of a Portable Powered Ankle-Foot Orthosis," 2011 Annual International Conference of the IEEE Engineering in Medicine and Biology Society. IEEE, Aug. 2011, 4 pages.
Thao et al. "A Pid Backstepping Controller For Two-Wheeled Self-Balancing Robot," International Forum on Strategic Technology 2010. IEEE, Oct. 2010, 6 pages.
Tilton et al. "Filtering with Rhythms: Application to Estimation of Gait Cycle," 2012 American Control Conference (Acc). IEEE, Jun. 2012, 6 pages.
Tsai et al. "Adaptive Neural Network Control of a Self-Balancing Two-Wheeled Scooter," IEEE transactions on industrial electronics, 57.4, Jan. 2010, 9 pages.
Uustal et al. "Study ofthe Independence IBOT 3000 Mobility System: An Innovative Power Mobility Device, During Use in Community Environments," Archives of physical medicine and rehabilitation, 85.12, Dec. 2004, 9 pages.
Wang et al. "Design of a Compact High-Torque Actuation System for Portable Powered Ankle-Foot Orthosis," Journal of Medical Devices, 10.3, Sep. 2016, 3 pages.
Waters et al. "The Segway Human Transporter: Developed with passion and principle," Design Management Journal (Former Series), 14.2, Apr. 2003, 4 pages.
World Health Organization "Fact Sheet on Wheelchairs," 2010, 4 pages.
Wu et al. "A Two-Wheeled Self-Balancing Robot with the Fuzzy PD Control Method," Mathematical Problems in Engineering 2012, Oct. 2012, 14 pages.
Xiang et al. "Wheelchair related injuries treated in US emergency departments," Injury prevention, 12.1, Feb. 2006, 4 pages.
Yoon et al. "Model-predictive active steering and obstacle avoidance for autonomous ground vehicles," Control Engineering Practice, 17.7, Jul. 2009, 10 pages.
Zhao et al. "Vision-aided Estimation ofAttitude, Velocity, and Inertial Measurement Bias for UAV Stabilization," Journal of Intelligent & Robotic Systems 81, Mar. 2016, 19 pages.

* cited by examiner

US 12,048,655 B2

LOW-PROFILE AND HIGH-LOAD BALL-BALANCING ROLLING SYSTEM

CROSS REFERENCE

This application is based on and claims priority to U.S. Provisional Patent Application No. 63/074,126, filed on Sep. 3, 2020, which is incorporated by reference in its entirety.

TECHNICAL FIELD

This application relates generally to a mobility device, and particularly to a low profile, compact, high-load, and modular ball-driven and self-balancing mobility device.

BACKGROUND

Manual wheelchairs cause upper extremity overuse injuries, require both hands for propulsion, have limited operation on certain terrains or tight spaces, and can tip easily resulting in possible falls and injuries. Powered wheelchairs currently available are heavy and large, which limits their use in tight spaces and also requires ramp/lift-equipped vehicles for transport. A different approach for achieving rolling mobility of a person with lower-limb disability is desired.

SUMMARY

This disclosure describes an omnidirectional ballbot platform with modular and adaptive design configurations and multi-mode human-robot input control interfaces. The disclosed platform improves upon hardware and control of self-balancing ball-based robots to allow for a safe, compact, high-load, self-balancing and intuitive mobility device for a person with lower-limb disability. Such a riding ballbot features omnidirectional and hands-free movement and ability to adapt to users of different sizes and trunk function ability in a variety of environments. The ballbot platform is designed with modularity to provide easy conversion into a companion robot capable of supporting substantial top-heavy payloads (e.g., adult human weight). The platform uses a ballbot drivetrain. The ballbot platform uses customizable and scalable design to accommodate different users in complex environments. The ballbot platform further provides two or more input control modes to propel the device in corresponding configurations: direct physical interaction (leaning of the torso while riding or pushing/pulling the companion ballbot), and remote command using an input device (e.g., joystick, gesture control, brain-machine interface). Advanced driving assistance such as obstacle avoidance and semi-autonomous navigation between predefined locations (indoor locations, in particular) is also disclosed.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages, and novel features of the disclosure will be set forth in the following detailed description when considered in conjunction with the drawings.

By way of introduction, the World Health Organization reports that –65M people are in need of a wheelchair. The 2010 US Census indicated 3.6M wheelchair users (WCU) over the age of 15. The majority of the wheelchairs being used are manual. Long-term upper extremity injuries due to wheelchair overuse have been identified in over 70% of manual WCU (mWCU). To effectively and efficiently propel a manual wheelchair (mWC), the user needs both hands, which compromises life experiences of mWCU due to inability to grasp and carry objects or hold another person's hand during propulsion. The design of the mWC, which is essentially a chair supported between two large drive wheels with front casters, has not changed since the first patents awarded in the 1860s. This design has further limitations that impact the user's life experiences including high risk of falling on uneven terrain with small obstacles, and inaccessibility to a variety of terrains (e.g., gravel, grass, sand, snow) and tight spaces (e.g., restroom stalls, airplane aisles). Powered wheelchairs address some limitations of mWC, as they operate with one-hand via a joystick and are more stable over small obstacles. Most WCU with sufficient upper limb functionality do not use powered wheelchairs due to their substantial weight (50 to 250 lbs.), runtime limitation (7 to 20 miles), larger size, and greater cost. Weight, footprint, and design may render these devices useless in tight spaces and add complexity to transportation due to their need for a lift-equipped vehicle.

Figure 1A:
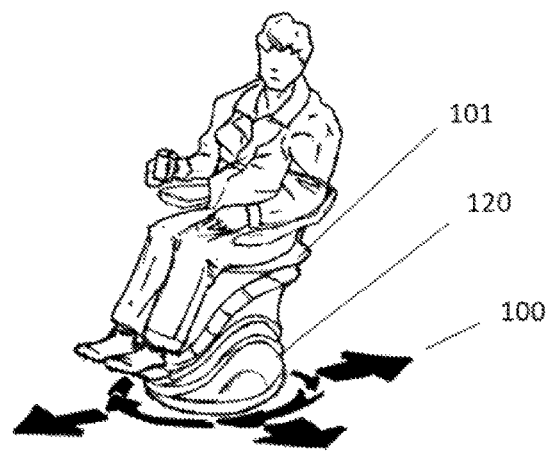
FIG. 1a illustrates an example Personalized Unique Rolling Experience (PURE) system.

As described in this disclosure, a Personalized Unique Rolling Experience (PURE) system, also referred to as a Modular, Interactive and Adaptive Personalized Unique Rolling Experience (MiaPURE) system, offers elegant, hands-free organic movement controlled with upper-body movements. The PURE system would break the mold of the traditional wheelchair by having the user sit above a single ball that interfaces with the ground instead of using wheels (FIG. 1a). Advanced technologies such as self-balancing and lean-to-steer are used in in the operation of such a system.

In various embodiments of the PURE system, self-balancing control in addition to mechanical safeguards eliminates falls or tip-over in complex environments having small obstacles or uneven terrain, and may open access to terrains unavailable to the narrow tires of mWC (e.g., gravel, sand, snow, grassy hills). Intuitive human-robot interfaces such as direct physical interaction between the human and robot provided by lean-to-steer control afford hands-free movement, allowing the user's hands to be occupied with more meaningful activities, such as holding a child's hand while crossing the street. Optional remote commands using an input device (e.g., joystick, gesture control, and eventually brain-machine interface) may allow for driving when lean control is not possible, such as when the rider is holding a wiggling baby or pet. Advanced control options such as driver assistance for obstacle detection and response can accelerate operator training, improve the driving experience, and reduce operator attentional demand. The sleek packaging of the robot provides a footprint that is smaller than an mWC, being no larger than the user's body dimensions while seated (e.g. no wider than the rider's shoulder width). This compact design provides access to smaller spaces such as public restroom stalls. Omnidirectional movement is possible in all directions: steering forward or backward, sliding sideways, and also allowing the user to spin 360 degrees from a fixed point (FIG. 1a). Unique features of the PURE system also include hardware modularity, such that a common lower chassis comprising a ballbot drivetrain may be combined with interchangeable upper chassis via detachable quick-connect features. The upper chassis may take the form of adjustable seats for different riders or a payload support to create a companion robot with the ability to carry substantial loads. Simple and quick separation of these relatively light robot components (ideally 20 lbs. per segment) also allows for easy transportation in a vehicle without need for a specialized lift.

This disclosure focuses on describing the application of self-balancing and lean-to-steer technology in a ballbot framework to achieve a compact, agile and safe daily-use robotic mobility device that features organic hands-free movement. This disclosure describes an ideal ubiquitous collaborative human-robot relationship that seamlessly integrates this co-robot into the user's everyday life. The structure, functions, and advantages of various embodiments of the PURE system are described in detail below.

Overall Design and Drivetrain

Figure 1B:
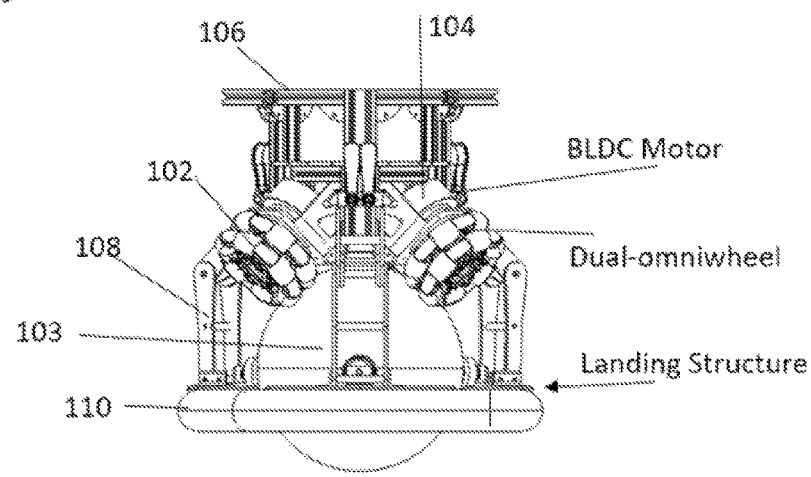
FIG. 1b illustrates an example drivetrain of the PURE system.
Figure 2A:
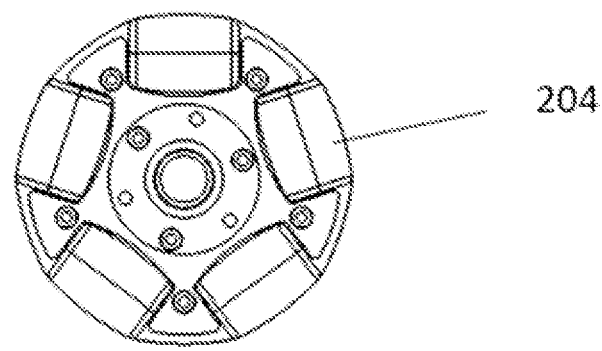
FIG. 2a illustrates a pair of double-plate omniwheels with discontinuous rollers on each wheel plate.
Figure 2B:
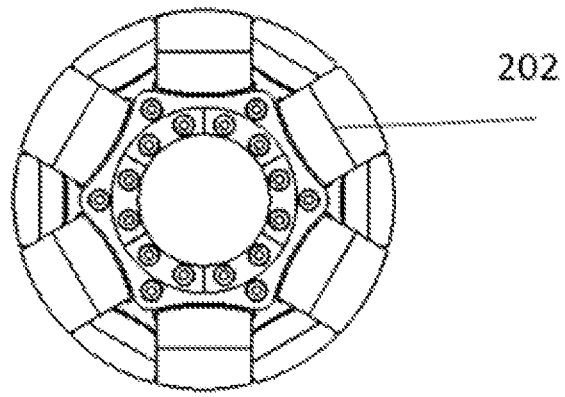
FIG. 2b illustrates a single-plate omniwheel with continuous rollers.
Figure 9A:
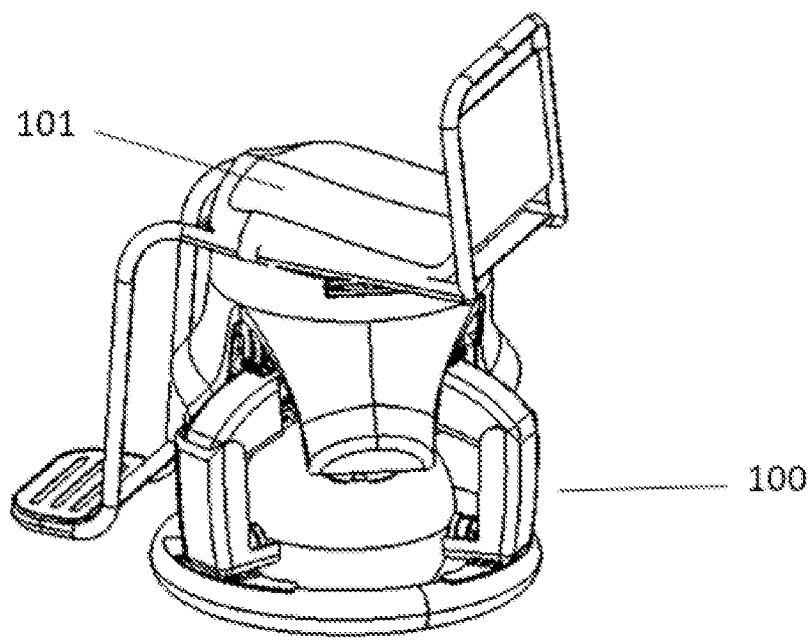
FIGS. 9a and 9b illustrates another example PURE system prototype.
Figure 9B:
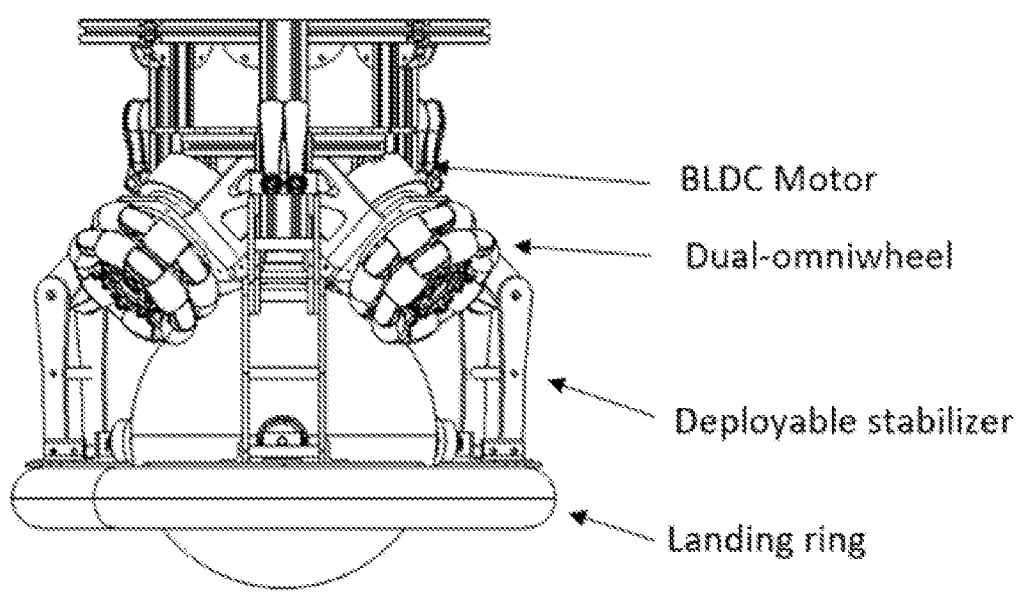

As shown in FIG. 1a and FIG. 9a, the PURE system hardware includes two main modules: a low-profile high-power density drivetrain 100 based on ball-balancing robot technologies, and a chassis containing a seat and human-robot interface hardware 101 (FIG. 1a. FIG. 9a). The ball-balancing robot, which was utilized as the basis of the drivetrain 100, is designed as a high load-bearing, omnidirectional, and compact footprint device that:

- allows for omnidirectional motion by incorporating multiple (e.g., three) pairs of continuous omniwheels 102 (FIG. 2a, 2b, FIG. 9(b)), in which each pair is driven by a brushless direct current (BLDC) quasi-direct-drive motor 104 (FIG. 1b, FIG. 2b, FIG. 9(b)), and each omniwheel may optionally include wheel plate(s) having rollers arranged continuously along the circumference of each wheel plate to provide a substantially smooth motion;
- is capable of enduring a maximum payload of 250lb or more;
- does not exceed human shoulder width; and
- does not exceed traditional wheelchair seat level (e.g., 17 inch) in height.

As shown in FIG. 1b, the ball-balancing robot portion the PURE system may include a ball 103 functioning as an omnidirectional wheel, driven, via friction, by a plurality of omniwheels 102 in contact with the ball. The omniwheels are driven by and attached to motors 104. The motors are fixedly attached to a motor frame 106, as shown in FIG. 1b. The motor frame or a separate support structure attached to the motor frame may be configured as a load platform of the ball-balancing robot for detachably receiving the seat platform 101 to accommodate a seated human or load chassis module as shown in FIGS. 1a and 1b. The ball-balancing robot may further include a landing structure 110 as shown in FIG. 1b and described in more detail below. These components of the ball-balancing robot may be enclosed, partially enclosed or surrounded by a shroud or skirt (illustrated in FIG. 1a, not shown in FIG. 1b). For example, the shroud or skirt 120 may cover the support frame, the omniwheels, and the landing structure in the raised position. The shroud or skirt may include an upper shoulder apart from and contiguously adjacent to a lower edge of a covering of the load platform.

Figure 1C:
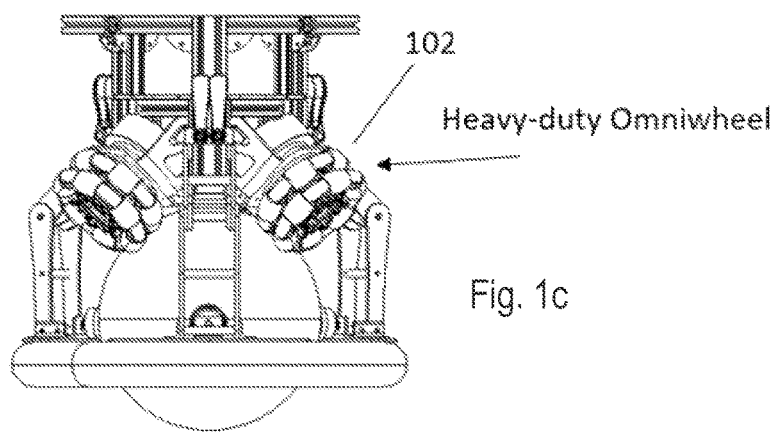
FIG. 1c illustrates another example drivetrain of the PURE system.
Figure 2C:
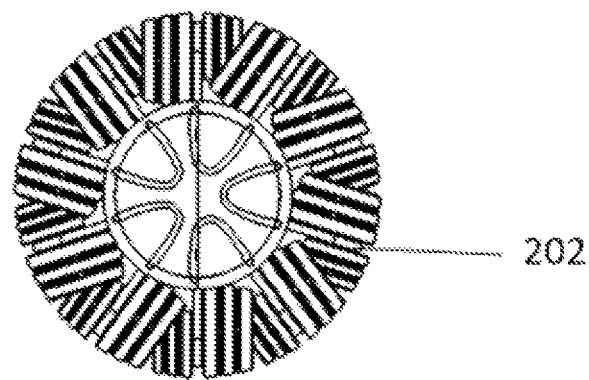
FIG. 2c illustrates a heavy-duty single-plate ominiwheel made of stainless steel.

The drivetrain of the PURE system may be seamlessly used as the base of an omnidirectional, load-bearing, and compact footprint device. The single-plate continuous-wheel omniwheels (FIG. 2b, 2c) generates smooth movement due to continuous small rollers 202 around its contour (in comparison to omniwheel plates with interleaved discontinuous rollers 204 of FIG. 2a). However, the load bearing capacity of this type of single-plate omniwheels made of, for example, aluminum (FIG. 2b) is significantly lower than that of a double-plate omniwheels (FIG. 2a), which has discontinuous rollers and can potentially cause disturbance. In this case, existing ball-balancing robots with this type of single plate omniwheels were not intended for high load bearing. In the PURE system, two or more single-plate omniwheels made of aluminum (FIG. 2b) or a heavy-duty single-plate omniwheel made of stainless steel (FIG. 2c) may be attached at each motor to increase the load capacity and generate smooth motion, while ensuring that the size of the drivetrain is compact enough to not exceed human shoulder width and height of the wheelchair seat (FIG. 1b, 1c). For example, an implementation is shown in FIG. 1b using double discontinuous roller omniwheels, whereas an implementation is shown in FIG. 1c using a single continuous roller omniwheel.

Modularity of Hardware

Figure 3:
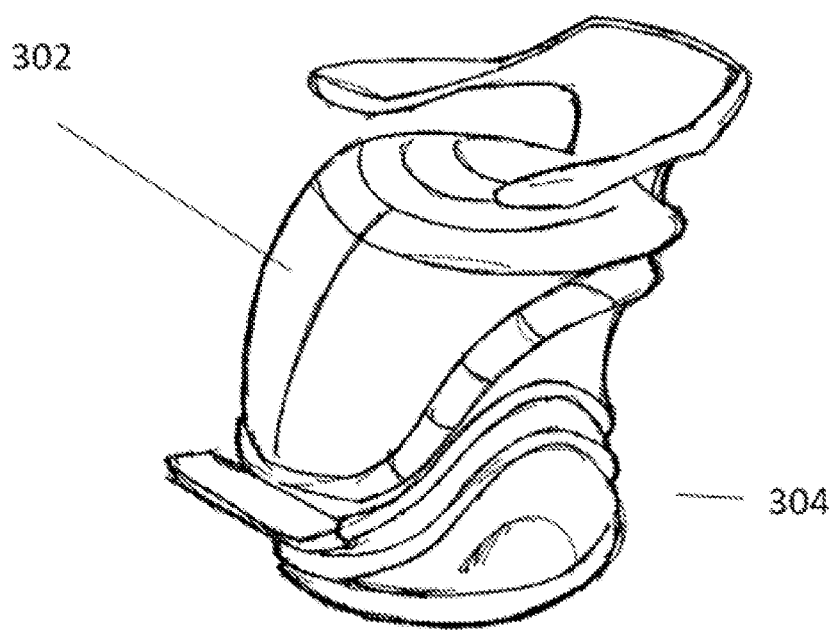
FIG. 3 illustrates an example PURE system with two detachably coupled modules.
Figure 8:
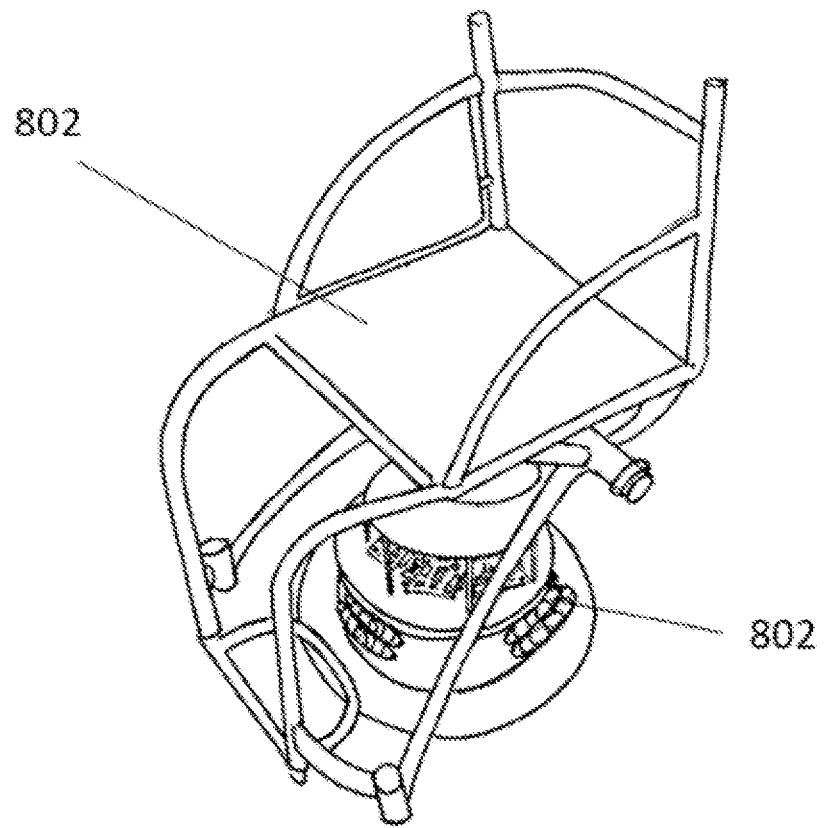
FIG. 8 illustrates an example PURE system prototype.

The PURE system hardware includes a mechanism that allows for quick disassembling into 2 or 3 lighter-weight modules for easy transportation (FIG. 3). In this embodiment, the PURE system may be separated into two or more lighter-weight modules. For example, as shown in embodiment of FIG. 3 and FIG. 8, the two or more parts of the example PURE system (such as the seat module 302 or 802 and the drive module 304 or 804) could be detachably coupled and separable. Any detachable coupling mechanism may be used for the two or more parts of the PURE system. For example, the load platform may be detachably coupled to the ball-balancing robot. These parts may be coupled with quick disconnect engagements allowing a human to detach the load platform by hand without the use of tools.

Stabilizing Structure

A stabilizing structure that can be actively controlled and deployed may be included in the PURE system. The stabilizing structure may be deployed to switch the robot from statically stable position (full ground contact, such as when the system is in park, neutral, or off) to a dynamically stable position as viewed in FIG. 4. Being dynamically stable means that the PURE system is stable when the balancing control system is activated and in drive mode. The ground clearance when in dynamically stable position can be adjusted to modulate the maximum tilt angle of the device.

Figure 4:
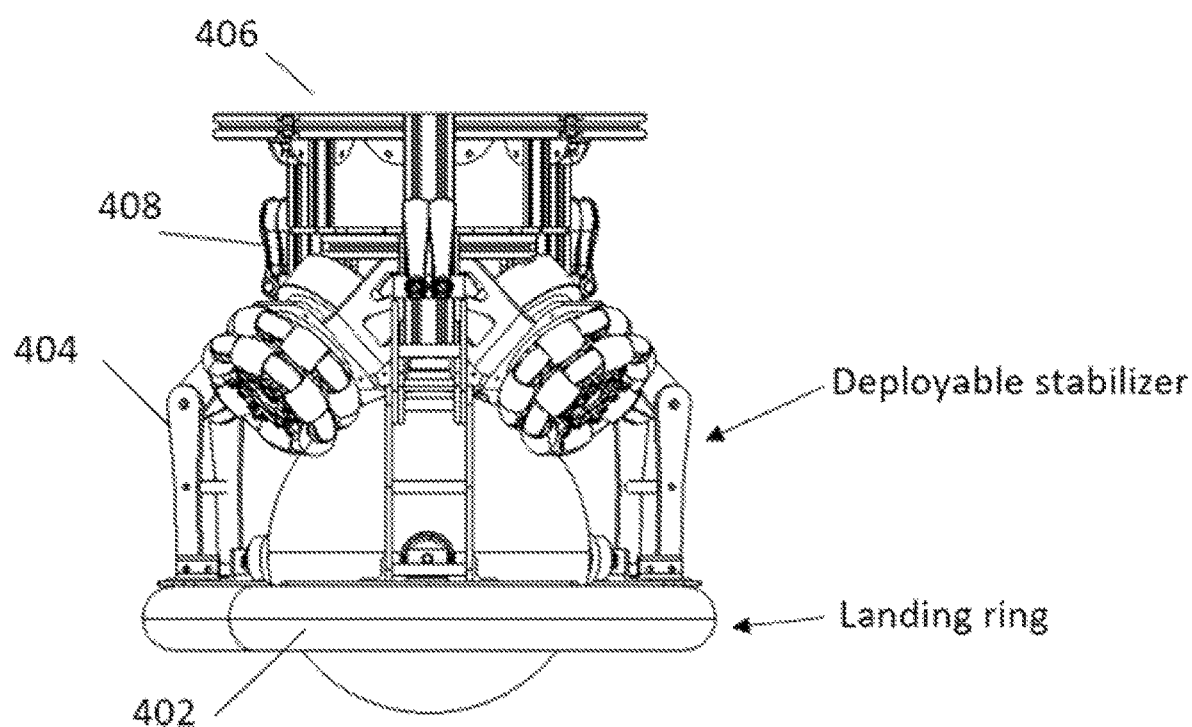
FIG. 4 illustrates an example stabilizing structure design using a series of four-bar linkages.

In one embodiment, the stabilizing structure may include a landing structure 402 adjustable by a series of linking arms 404. The landing structure 402, for example, may include a landing ring as shown in FIG. 4. The linking arms 404 may be sectioned. For example, the linking arms may each be configured as a four-bar linkage or any other linkage structures. The linking arms may be attached to the motor frame 406 or body of the ballbot on one end and to the landing ring on the other end. The linking arms may be manually deployable using a levering mechanism that can be engaged by the rider (see the handlebar 408 in FIG. 4), or may be motorized (engaged using the ballbot-human interfaces described elsewhere in this disclosure). The landing ring may be lowered to function as a ground support when the PURE system is in the park, neutral, or off mode. The landing ring may be raised when the PURE system is in drive mode. The distance between the landing ring and the ground may be adjusted and controlled in accordance with the driving speed and other parameters. Such a distance may be adjusted to allow for a maximum tilt angle of the PURE system in driving mode such that the PURE system would not inadvertently tip over.

The tilting angle of landing structure may be adjusted to adapt to a surface such as a floor or a ground in any of the operation modes by controlling the linking arms.

The landing structure, such as the landing ring 402 of FIG. 4 may further include caster wheels for ground support and rolling when the PURE system is in the park, neutral, or off mode. The PURE system may thus function as a roller chair. In particular, as a rolling chair, the ball with its drivetrain (the omniwheels and the motors) may be placed in neutral to freely roll.

Figure 10:
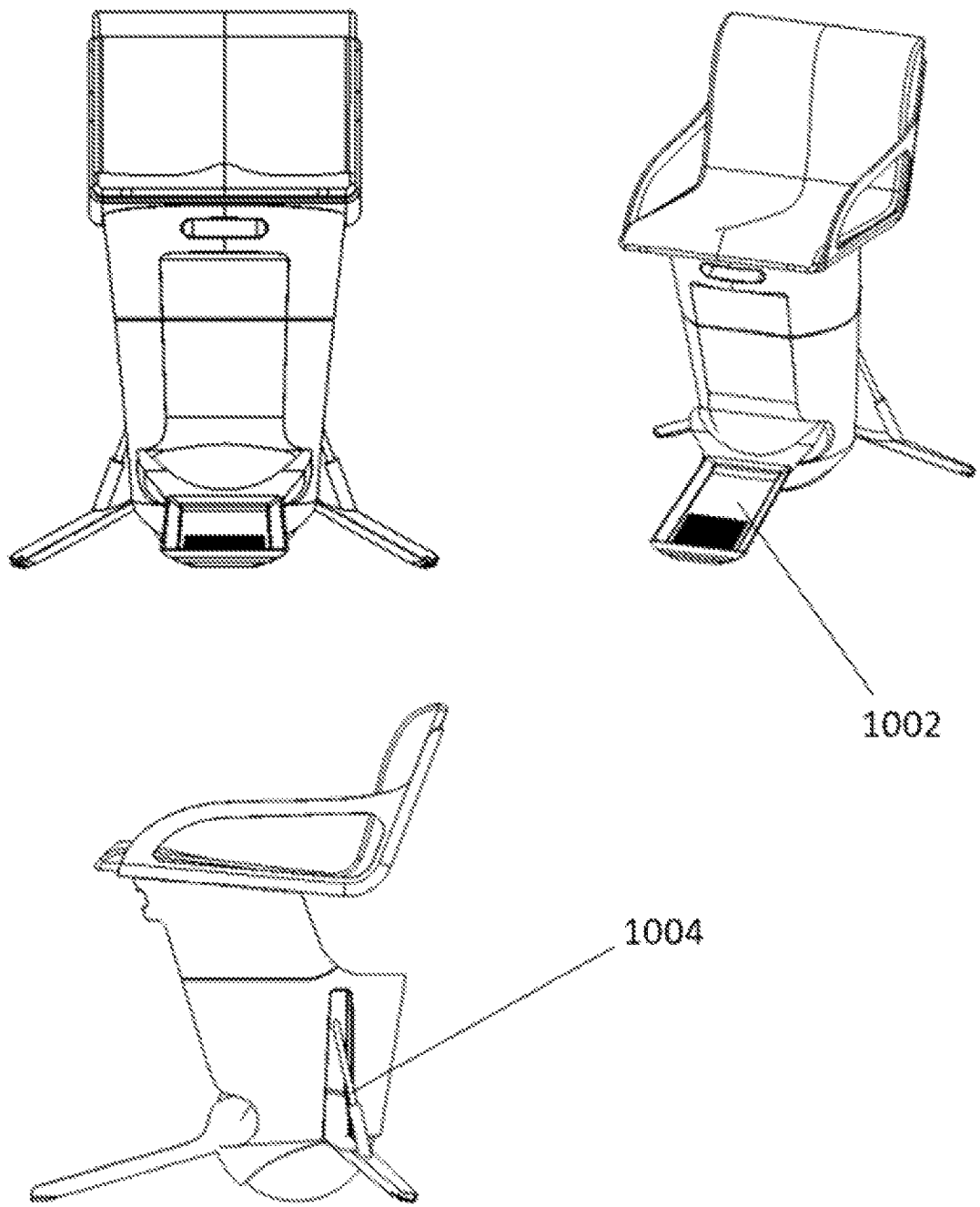
FIG. 10 illustrates another example stabilizing structure design using a footrest stand and a plurality of support legs.

In some alternative implementations, as shown in FIG. 10, the stabilizing structure may include a footrest stand 1002, and/or a plurality of support legs 1004. For example, the footrest stand 1002 and the support legs 1004 may be placed into a drive configuration and a park configuration. In the drive configuration (e.g., when the PURE system is in a drive or neutral mode), the footrest stand may be horizontally positioned for footrest and the plurality of support legs may be retracted into the body of the PURE system. In the park configuration, the footrest stand and the support legs may be engaged as support for the PURE system over a surface of a floor or a ground. Switching between the drive configuration and the park configuration may be accomplished manually or via motors. As an example and as shown in FIG. 10, each of the support legs 1004 may be designed as a foldable or retractable leg. Each support leg may be pivotally attached to the motor frame, the shroud, or the body of the ballbot on one end, and attached to one end of a retraction or folding device between the two ends of the support leg. The other end of the retraction or folding device may be attached to the motor frame, the shroud, or the body of the ballbot. The retraction or folding device may be manually retracted/extended or folded/unfolded to switch the support ledges between the drive configuration and the park configuration. Alternatively, the retraction or folding device may be motorized as commanded using the ballbot-human interfaces described elsewhere in this disclosure. The footrest stand may be similarly engaged.

Multiple Input Modes

Figure 5:
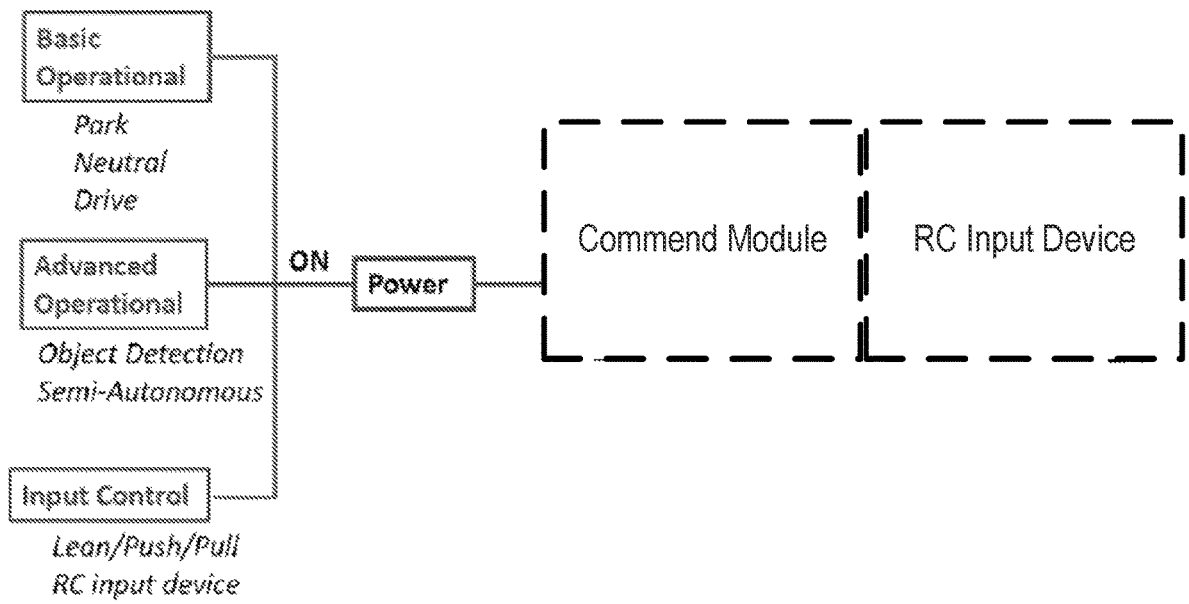
FIG. 5 illustrates an example user-centric and intuitive human-robot interface.

The PURE system includes hardware and software that provide a multi-mode human-robot interface (FIG. 5). There are three basic operational modes: park, neutral, and drive, as shown as 502, as well as an advanced operational mode which may involve semi-autonomous navigation and objective detection, as shown as 504. In addition, the input control mode may be either direct physical interaction (lean-to-steer or pushing/pulling) or remote commands from an input device (i.e. joystick, electromyography (EMG), brain-machine interface, etc.), as shown as 506. These basic operational, advance operational, and input control modes, along with power, may be selected through a Command Module user interface.

As shown in FIG. 5, the PURE system has a user-centered and intuitive human-robot interface 508 that provides basic operational mode selection and advanced operational mode selection along with different input controls.

An intuitive human-robot user interface 508 is important in terms of safety and adaptation. Wheelchair users are often faced with many challenges in terms of operating the wheelchair, including divided attention due to multitasking of operating and stabilizing the wheelchair while performing daily activities (e.g., holding/reaching for an object), limited vision and awareness of surroundings (e.g., uneven surface, nearby objects or humans, darkness), steep learning curve of adjusting to wheelchair usage for new users, and mechanical and/or hardware system failure (e.g., brake problem). Common wheelchair user accidents are mostly due to inattention (e.g., forgetting to brake), lack of awareness of surroundings, inexperience. An organic and intuitive human-machine interface system that can help reduce wheelchair accidents (FIG. 5).

The PURE system provides multiple operating modes to maximize safety, to help navigate through complex surroundings, and to reduce the learning curve. There are four primary modes of control: Power 510, Basic operational modes 502, Advanced operational modes 504, and Input device modes 506 (FIG. 5). The Power mode provides on- and off-mode control. The off mode enforces appropriate deceleration without abrupt and unsafe stopping. Controls can be overridden to ensure stopping of the PURE system when desired. For the on-modes, basic and advanced operation modes and selection of input device mode may be provided. The basic operational mode may include simple states of the ballbot using manual input from the user. This mode may further include other modes: 1) Park mode for deploying locked stabilizer feet and disengages device movement to provide solid footing for the user, 2) Neutral mode for deploying stabilizer feet with castors (see above) and disengages device movement control allowing for self-propelling or external pushing, and 3) Drive mode for detecting changes in body pose and other device interface to engage system movement accordingly. Within the Drive mode, multiple movement options may be provided, including Steer, Slide, and Spin, for example. To further reduce mental and attentional burden on the user, advanced operational modes are further introduced. These modes include obstacle detection and response and semi-autonomous navigation between predefined indoor locations. These various operating modes above may be contained and controlled using a simple command module which may take the form of a console with buttons/knobs or a touch-screen tablet. The design and layout of this command module may be carried out via user-centered design approach for intuitive interface.

In addition, the PURE system may include a remote command (RC) input control device 520 for effective basic Drive features for users who do not want or cannot use the lean-steer feature direct physical interface (DPI). Potential options for RC input device may be as simple as a joystick or as sophisticated a gesture control detected using a camera vision system, or a voice command detection system. Note that the remote command input may be on the same piece of hardware as the command module.

Hands-Free Human-Robot Interface

The software of the direct physical interaction mode exploits force interaction between the rider and the device. The force interaction may be caused by independent upper body motions, including but not limited to 1) lean forward/backward, 2) lean right/left, and 3) trunk rotation to provide an intuitive hands-free control of the omnidirectional movements.

Figure 6A:
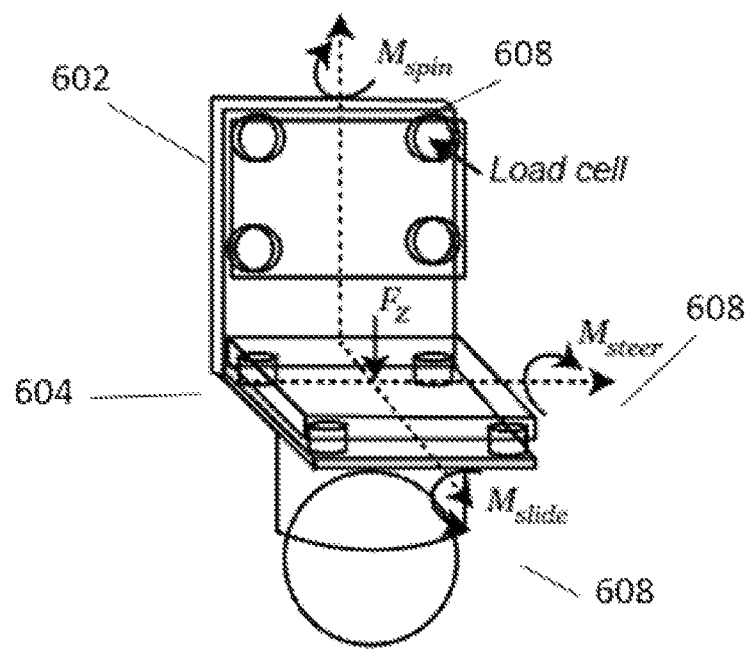
FIG. 6a illustrates an example design of a force sensitive seat (FSS).
Figure 6B:
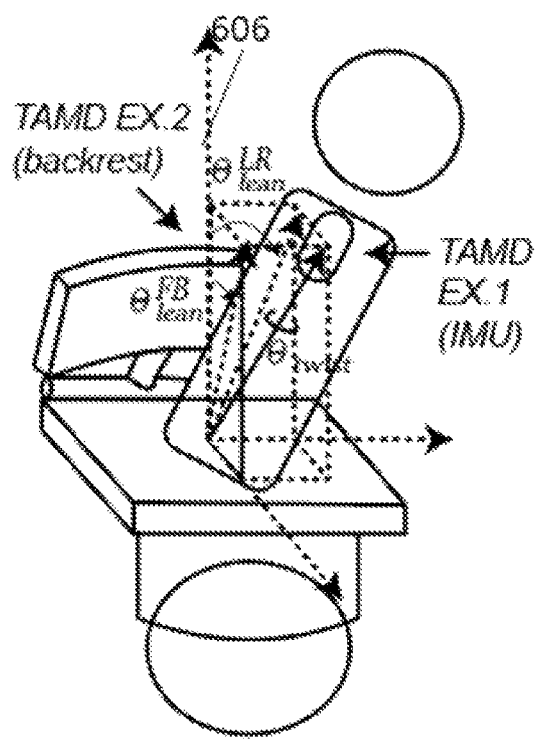
FIG. 6b illustrates an example design of a torso angle measuring device (TAMD).

Hardware and software are designed to allow the user to control Steer, Slide and Spin independently by using their torso movements, without a handheld joystick. For example, Steer may operate similar to a standard vehicle: forward, backward, turning. Slide may translate the robot sideways (unique feature of omnidirectional movement). Spin rotates the robot about the yaw axis at a fixed point. Steer is regulated by leaning the torso forward and backwards, while Slide is commanded by leaning left or right. These strategies regulate translation by perturbing the upright equilibrium position of the robot, forcing it to move in the desired direction. Controlling Spin represents a major challenge because the motion of the user does not substantially affect the robot's balance. To independently control the Spin rate, two embodiments introduce 1) a force sensitive seat (FSS) that monitors the pressure distribution of the user's body (FIG. 6a), and 2) a utilize torso angle measuring devices (TAMD) that measure the torso angle of the user's body (FIG. 6b). For the FSS, the user may control the Spin rate by regulating the interaction forces between the user and the seat. For the TAMD, the user may control the Spin rate by regulating torso angles.

The FSS may be installed with multiple force sensors 602 and 604, the combination of which may be used to detect a user body gesture as shown in FIG. 6(*a*). Specifically, the distribution of the forces as detected by these sensors may be analyzed to obtain a user intent. The TAMD may utilize various wearable or non-wearable sensors that measures the torso angle 606 of the rider shown in FIG. 6*b*. Specifically, the torso angles 606 from the sensors may be analyzed to obtain user intent. The detected forces and estimated torso angles may be parameterized into a predefined set of indicators, such as user rotation along several predefined axis 608 as indicated in FIG. 6. User command(s) may be derived from these indicators. The force information may include both the force distribution and the timing of the forces. For example, a particular user command may be associated with a time sequence of forces among the plurality of distributed sensors. The torso angle information may include both the magnitude and the timing of the torso angles. In addition, relationship between force/torso angle patterns and user commands may be automatically learned as the PURE system is being used be a particular user.

As a result, the rider may simply lean the upper body in the desired direction of movement to control the robot driving into that direction, as well as rotate the trunk to turn the device into the desired heading direction. More specifically, the rider may enable omnidirectional movement such as:

1) Steer: lean forward/background to control the speed, lean left/right to control the turning.
2) Slide: lean to move in any direction without turning.
3) Spin: turning about upright axis.
4) Or any combination of these three movements.

In more detail, the PURE system may provide completely hands-free control for different driving modes (Steer, Slide, Spin). The Steer mode functions similarly to a standard vehicle: forward, backward, turning. The Slide mode translates the robot sideways (unique feature of omnidirectional movement). The Spin mode rotates the robot about the yaw axis at a fixed point. Instead of using a hand-triggered input device, the force interaction between the user and seat is exploited and user intent is collected based on sensors embedded in the seat. The omnidirectional movement of the PURE system may be fully controlled with the torso movement of the user, freeing the hands and arms for other important tasks. In addition to hands-free control, intuitive user interfaces are created using a user-centered design methodology to address functional needs of users while ensuring their safety. Multiple operation modes such as Park, Neutral and Drive modes are included to cover the majority of daily activities. Remote command interfaces are also implemented for users who do not want (or temporarily cannot) utilize lean-to-steer driving control.

In more detail for the FSS, the design of the FSS utilizes an array of load cells to measure the interaction forces between the user and the balancing subsystem (FIG. 6). The design is similar to a miniaturized force plate. Steer and Slide are regulated by applying moments to the seat around the respective horizontal axes, and Spin rate is commanded by applying moments to the back, in the vertical axis. The net vertical force applied to the seat is monitored to estimate the payload magnitude. To not accidentally activate spin mode while the user briefly reclines when temporarily stopped, the FSS may be tuned to require relatively large applied loads to the seat back to initiate spin.

In more detail for the TAMD, the design of the TAMD may utilize various sensors include but are not limited to inertial measurement unit sensors, potentiometers, encoders, computer vision system to measure the torso angles. For example, the TAMD may be a 1) wearable device containing a sensor (e.g., inertial measurement unit or IMU) placed on the rider's torso, or 2) a non-wearable device that takes a form of a backrest with angle measurement sensors (e.g., rotary encoders) to measure the torso twist angle (Note that the backrest continuously maintains contact with the rider's back, which may be done using spring or other mechanisms), or 3) computer vision system that monitors the rider's upper body movement to estimate the torso angles using vision data and various vision/machine learning algorithms. Steer and Slide are regulated by leaning forward/backwards or left/right, and spin rate is commanded by twist the torso about the vertical axis.

Human-Augmented Mobility Control (HAMoC)

The PURE system includes hardware and software that provide higher-level control to improve safety, user driving experience, and reduce operator attentional demand. The PURE system uses human-augmented mobility control (HAMoC) to prevent the ballbot system from endangering itself and the operator when in Drive mode. This method enables the robot to be driven or navigated safely while the operator is learning to drive the PURE system and in uncertain environments (such as cluttered spaces) through limiting the driving speed and to regulate the system maneuverability. The policy effectively safeguards the system from sudden obstacles, environmental complexity, and sudden unexpected movements of the rider.

To ensure system (operator and device) safety, a HAMoC approach for the PURE system may be considered to include (a) an emergency collision avoidance system and (b) shared motion control to reduce the proficiency requirement and filter unintended control input of the operator. For example, an Occupancy Grid may first be used to determine the surrounding obstacles or hazardous terrain using an onboard multi-sensor array including short-range and long-range sensors. A controlled stop protocol may be triggered if an unexpected obstacle is detected by the short-range sensor to avoid collision. Furthermore, a predictive approach, such as Model Predictive Control, may be used to regulate the user's input (either from remote command or direct physical interaction) to ensure system safeguarding based on distances from surrounding obstacles and current speed of the robot. For example, a speed limit may be enforced in a cluttered or dangerous environment, and sudden motions caused by unintended physical actions, such as reaching or a seizure attack, may be filtered.

Figure 7:
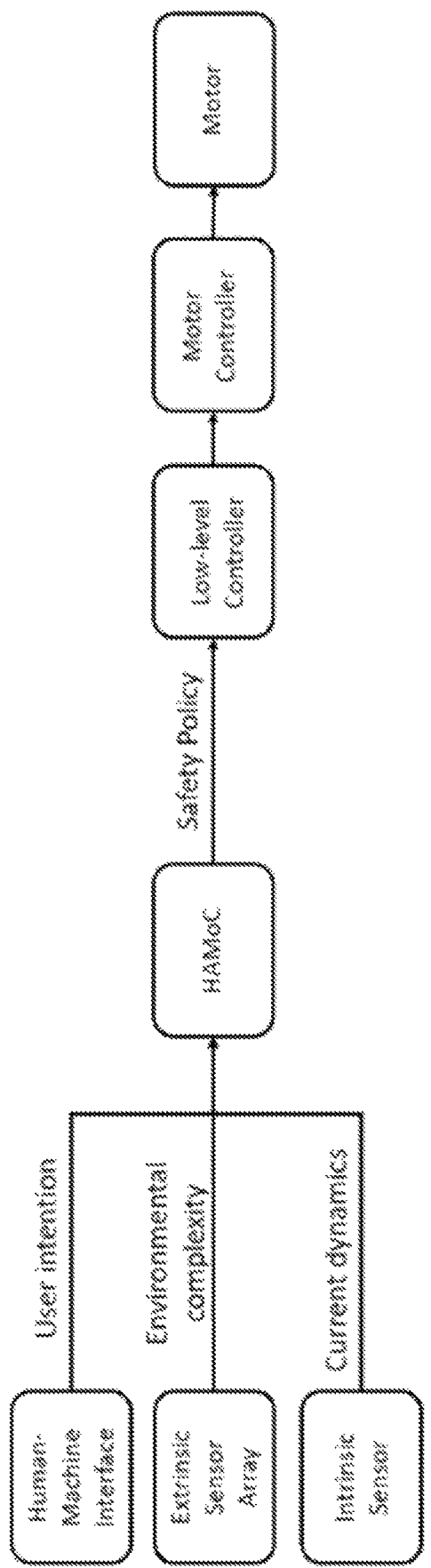
FIG. 7 illustrates an example architecture of human-augmented mobility control (HAMoC) of the PURE system.

The use of PURE's HAMoC approach is different from other shared control systems because HAMoC, as shown by 702 of FIG. 7, needs to handle the unstable dynamics of the PURE device as well as the human rider's direct physical interaction (the dynamics of the human rider) to achieve the unique need for safe and stable control of a self-balancing ball-driven mobile device FIG. 7. For example, unlike a regular powered wheelchair (which can choose to reject the user's command by simply disabling motor function), the user can force the ballbot to travel towards a certain direction by leaning. The ballbot has to travel forward to recover from the change in the system's center of mass to dynamically stabilize itself. Therefore, PURE's HAMoC has to predict and prepare for counteracting the user's leaning actions that might endanger the system.

Details for obstacle detection and shared motion control are described below. The term Human-Augmented Mobility Control (HAMoC) is considered to be a progressive form of "Shared Motion Control" (SMC) that is described below. The HAMoC system adapts and enhances the user's capabilities, independent of the degree of their disability, to ensure safe and effective operation.

Controlling and operating a ballbot, a 5 DoF (Degree of Freedom) system, may require considerable operator proficiency and experience, not to mention compensating for additional complexity imposed by the environment. In this disclosure, an Occupancy Grid and Model Predictive method may be adapted to prevent the ballbot system from endangering itself and the operator. This method may enable the robot to be driven/navigated safely in uncertain environments through limiting the driving speed and modifying the systems maneuvers. The policy may effectively safeguard the system from sudden obstacles and environmental complexity. As an under-actuated system, the ballbot needs to accelerate forward to bring the center of gravity backward (proportional to the current driving speed) prior to applying deceleration on the spherical wheel. This dynamic nature implies that the braking/stopping distance has to be estimated based on its dynamic model and present state. This is not an easy task for operators who are new to mobility devices with high degrees of freedom. As a result, the onboard high-level controller may determine whether an operator command will lead to an unsafe terminal state in the future (moving too fast in a cluttered environment) according to the distances to adjacent obstacles and the complexity of the surrounding. This information may be used to regulate the operator's command.

The obstacle detection and shared motion control tasks of the PURE system may include: 1) establishing a controlled stop mechanism and a safeguarding protocol that actively responds to unexpected obstacles; 2) building a local Occupancy Grid which maps surrounding obstacles and local terrain hazards that may endanger the robot and operator; and finally, 3) building a Model Predictive algorithm which utilizes the local Occupancy Grid to enable Shared Motion Control. The term Shared Motion Control (SMC) refers to a method using robot perception to assist and regulate the user's input while controlling a dynamic system.

A multi-layer sensor array 704 and 706 may be included in the PURE system for assisting obstacle detection and shared motion. The sensor array may be configured with two or more sets of sensors: 1) short-range (<1 m) sensors that can detect low obstacles close-by and trigger the controlled stop protocol; and also, 2) long-range (>1 m) sensors that detect obstacles and hazardous terrains (stairs, steep slope, uneven floor, etc.) from a distance. Short range sensors such as Infrared Ray (IR) proximity sensors and long-range sensors including Light Detection And Ranging (or LIDAR) and cameras may be adapted to the obstacle detection and shared motion control task. In a manned driving scenario, the operator's body may block the operational view of the onboard sensor array. The trade-off between maintaining an optimal perception configuration and building a compact and modularized package may be further taken into consideration. The controlled stop protocol may be implemented to protect the device/PURE system. The controlled stop protocol may be a simple but reactive algorithm that decelerates the ballbot system until the velocity becomes zero in the direction of possible collision (determined by the short-range sensors). The ballbot may be free to move in any direction that does not lead directly to obstacles.

The information collected by the long-range sensors may be used to generate and update a local Occupancy Grid with a 3~6 m radius (typical bedroom/office room's dimensions) around the robot in real-time. Point cloud, visual information, and Euler angle estimation may be fused using an onboard mini-PC (e.g., NVidia Jetson Nano or TX2) and input to the local Occupancy Grid. Hazardous terrain and obstacle position, shape, and relative velocities may be processed by, for example, a Probabilistic Velocity Obstacle (PVO) model which may update a 4D probabilistic Occupancy Grid (space and velocity). As the robot proceeds forward, the local map may be updated as a sliding window.

The PURE system is implemented to reduce the operator's proficiency requirements, enabling the operator to control the ballbot without a deeper understanding of the dynamics of the ballbot or knowledge of how to perform low-level motion adjustments. While the robot constantly monitors and ensures system safeguarding, a control regulator may be applied that enforces a safety regulation on the system while respecting the operator's intention utilizing the locally generated Occupancy Grid to define critical regions of potential collision risks. To prevent the ballbot system from reaching a critical region requires an accurate look-ahead distance enabling ballbot deceleration. Given the distances between hazardous regions, the robot's current state, and dynamic model of the robot, the PURE system may be configured to predict operator commands that may cause terminal states that may endanger the whole system using a predictive model. From there, the terminal states attainable using the operator's command may be limited for safety.

The SMC assumptions may be made, including, for example 1) the robot is operating in an uncertain indoor environment filled with static and slowly moving dynamic obstacles (~1.4 m/s, average walking speed); 2) the robot can estimate its own state variables (including relative position to adjacent obstacles, linear velocity, Euler angles, and their derivatives) and control output accurately; 3) yaw rotation dynamics have little effect on overall system momentum compared to forward direction dynamics; and, 4) the ballbot system's initial state will not lead to an immediate critical terminal state (near the Sensing Boundary or Performance Boundary). For example, based on assumption 3, the dynamic model of the ballbot during deceleration/braking in a 4D space may be simplified and formulated (with translation and pitch movement). This algorithm slows down the current speed of the ballbot and enforces a speed limit if the surrounding regions appear to be cluttered. The level of threat will be determined by the distance from the closest obstacle or closeness to hazardous terrain. If the operator forces the ballbot to accelerate further, the ballbot may attempt to act against the command/physical movement. The allowable speed limit may decrease as the ballbot gets closer to an obstacle or hazardous terrain, and eventually, the allowable speed may drop to $V_{critical}$, a speed that can ensure safe stopping.

Semi-Autonomous Features Enabled by the HAMoC

On the basis of HAMoC, semi-autonomous navigation technologies that have previously applied in only statically-stable devices may be implemented in the PURE system as a dynamically-stable device. In a similar fashion, HAMoC may ensure that none of the motion commands sent by the semi-autonomous navigation module may bring the system to a terminal state. This control allows for use of standard path planning techniques such as A* Search and obstacle avoidance techniques such as Potential Field to govern the navigation of the system. To be more specific, semi-autonomous features such as the following may be achieved:

The operator can command the device to navigate between pre-defined locations (e.g. bedside, charging dock, restroom, etc.) using the onboard control panel, vocal commands or with a summoning device. An interchangeable local map of the environment or a SLAM technique may be used to define the device's current and target locations.

The operator can also command the device to perform object following (e.g., another device, human, etc.) using the camera system on the multi-layer sensor array.

The sensor array may be modified to include localization sensors that estimate the device's current position and orientation with respect to some defined coordinates (e.g., GPS, Ultrawideband, enhanced dead reckoning).

To implement semi-autonomous navigation between pre-defined indoor locations, optionally, off-the-shelf indoor localization solutions (Ultra Wide Band, Radio-frequency identification, or Wi-Fi fingerprint) may be used. The localization solution may be selected based on its performance, pricing, and compactness. Once the localization mechanism is installed, standard path planning and obstacle avoidance techniques such as A* Search, and Potential Field may be used to prevent collision while the ballbot travels between two pre-defined indoor locations (e.g., office and restroom). The ballbot may be configured to attempt to reach the goal location if a clear path can be generated given a global map. The level of robust autonomy in this navigation behavior provides a consistent and controllable method to evaluate system performance and the functionality of the ballbot system, including the low-level adaptive controller 708 and high-level operator assistance package.

Drivetrain and Low-Level Controller

In one implementation, the drivetrain of the PURE system comprises a ball, set of three omniwheels and motors, sensors (e.g., IMU, encoders), electronics, battery and structural elements. It is constructed from structural materials (aluminum, carbon fiber) designed to handle a maximum payload of 250 lbs (113 kg). The actuation system allows for an increased torque production that is necessary for large tilt angles and increased driving speed (e.g., a maximum velocity of 2.7 m/s, a maximum acceleration of 1 m/s$^2$, a maximum recovery angle of 16°, a minimum braking distance of 3 meters with initial speed of 2.7 m/s, and a maximum climb angle of 15°). The drivetrain features flat brushless direct current (BLDC) motors, low gear-ratio single-stage planetary gearbox (~7.6:1).

The actuation system results in a transparent torque transmission with minimal friction as well as a high system bandwidth. In addition, two aluminum omniwheels are combined into one set of double-plate omniwheel to increase the load capacity and provide a smooth and continuous contact with the ball, compared with non-continuous omniwheels used in some other ballbot systems.

The actuation system provides shock tolerance. When there are shocks caused by uneven road condition or obstacles, shock loads may transmit through the ball to the omniwheels, then to the motors. The low gear-ratio gearbox in the drivetrain may prevent the motors from being damaged. Furthermore, multiple-teeth contacting nature of the planetary gearbox also contributes to shock resistance. The single stage planetary gearbox may achieve 97% energy efficiency, benefiting the PURE operating time and weight budget on battery.

In addition, the low gear-ratio of the gearbox leads to low impedance and friction between the motors and the omniwheels, resulting in higher force transparency.

In this implementation, a controller to control the ballbot for balancing and trajectory tracking under direct physical interaction or remote command is further disclosed. The controller is implemented as a linear quadratic regulator (LQR) controller.

The LQR controller issues actuation commands that minimize the difference between target and current trajectories while maintaining dynamic stability of the system.

LQR is a classical optimal control algorithm that generates the optimal control command to minimize a weighted cost function that is composed of both energy expenditure and tracking error. For a specific plant, system dynamics are derived. System identification may first be conducted for the specific plant, followed by derivation of the equations of motion using Lagrangian's method as $J^T(q)\tau = M(q)\ddot{q} + C(q,\dot{q})q + G(q)$, where $q=[\theta,\varphi]^T$ (upper body tilt angle and wheel rotation angle, respectively), and $q=[\theta_x,\theta_y,\theta_z,\varphi_x,\varphi_y]^T$ (yaw, pitch, roll angle of the drivetrain and yaw, pitch angle of the ball, respectively), $M(q)$ represents mass/inertia, $C(q,\dot{q})$ represents Coriolis and centrifugal forces, and $G(q)$ represents gravitational forces. A state-space model may then be constructed and linearized about its equilibrium: $\dot{x}=Ax+Bu$. A and B are the state and input matrices, $x=[q,\dot{q}]^T$ is a vector of the system states, and $u=\tau$ is the output torque of the motor 712 in the PURE system, while $u=[\tau_1,\tau_2,\tau_3]^T$ is the vector of torque output for all three motors. An LQR controller may then be constructed based on the state space model and weight matrices: Q and R, whose elements may be tuned to achieve desired system responses. The optimal LQR gain may then be calculated to be $K_{lqr}$. In addition to this feedback LQR controller, a feedforward friction compensation term, $f(\cdot)$, may be added to the motor control command for motor controller 710 such that $u_{cmd}=K_{lqr}(x_{ref}-x)+f(\dot{\varphi}_1,\dot{\varphi}_2,\dot{\varphi}_3)$, where $\dot{\varphi}_1$ is the rotary speed of motor i, represents the friction model of the motor that may be experimentally determined, and $x_{ref}$ is a vector of the reference trajectories that may be specified based on different input control modes and drive modes, which are explained in details below.

With the implementation of the LQR controller, the movement of the PURE system may be controllable. The movement of any ballbot in the global space can be decomposed in three components: forward-backward linear speed ($v_{fb}$) left-right linear speed ($v_{lr}$), and roll angle rotational speed of the drivetrain ($\omega_{roll}$). A linear combination of these components may result in different types of drive modes including: a) Steer: $f(v_{fb},\omega_{roll}|v_{lr}=0)$; b), Slide: $f(v_{fb}, v_{lr}|\omega_{roll}=0)$; and c) Spin: $f(\omega_{roll}|v_{fb},v_{lr}=0)$. The PURE system can theoretically generate more movement patterns that are not imaginable with the traditional vehicles, through a linear combination of all three components, i.e. $f(v_{fb},v_{lr},\omega_{roll})$ The PURE system supports two types of input controls modes: a direct physical interface (DPI) where a user use his/her body to control the PURE system, and a remote control (RC) input control mode, for users who do not want or cannot use the DPI. Different reference trajectories may be mapped from distinct input signals used for RC and DPI modes to control the motion of the PURE system. In the RC mode, three independent signals generated from the input device ($c_1,c_2,c_3$) may be directly mapped to three global reference speeds ($v_{fb,ref},v_{lr,ref},\omega_{roll,ref}$). The generated reference speeds may then be converted to reference system states ($\dot{\varphi}_{x,ref},\dot{\varphi}_{y,ref},\dot{\varphi}_{z,ref}$) to be used in the feedback controller, while the rest of the reference states are set to zero. In the DPI mode, all state references are set to zero except for drivetrain roll angular speed. Due to the self-balancing nature of the basic controller when the state references set at the equilibrium, the PURE system is already capable of sliding into the direction of torso leaning due to the shifted center of mass (CoM) in the corresponding direction, so no mapping of reference ball angular velocities is necessary. The force-sensing seat proposed earlier in this disclosure would sense changes in force distribution or torque in upright z-axis due to torso rotation, which can be further utilized as an input signal that can be mapped to the reference roll angular speed of the drivetrain, i.e., $\dot{\theta}_{z,ref}=f_{seat}(F,\tau)$, where F and $\tau$ are output signal vectors from the force-sensing seat.

Furthermore, in order to address customizability and versatility to nonlinearities and uncertainties in the PURE system, additional control approaches are implemented to:
1) Adapt to system CoM offset due to different payloads (human and static).
2) Resolve system parameter uncertainties introduced by different size and magnitude payloads (human and static).
3) Improve trajectory tracking during agile movement over challenging terrains (e.g., slopes, concrete sidewalk, gravel).

For the PURE system to be stationary, the CoM of the robot+user has to be right on the top of the ball center. Different users may have different neural seating posture and have slightly different CoM offset from the robot's CoM. In this case, additional calibration needs to be performed with the user initially seated on the robot, while the user may be instructed to stay at the neutral posture. The calibration protocol is given below:
1). Set all reference trajectories to be zero (including the ball displacements).
2). The robot may drift a short distance due to the CoM offset to tilt its drivetrain and align the CoM of the robot+user with the ball centerline.
3). Until stationary, the current value of drivetrain tilt angle may be set as the new offset, and restriction of ball displacement may be relaxed in the meantime.

The PURE system is designed to fit different size and weight of payload (human and static). The presence of such difference would change mass and inertia properties of the system. As such, system responses may be degraded, and the stability margin of the controller may decrease. In this implementation, a force-sensing seat is utilized to estimate the rider or static payload weight in order to obtain a more accurate LQR gain. Given a measurement of the force exerted on the seat, the added weight and inertia may be estimated, based on anatomical relationships in the case of human riders. Such calculation may be done during the calibration mentioned above. The estimated mass and inertia properties may be utilized in the nonlinear Equation of Motion (EoM): $J^T(q)\tau=M(q)\ddot{q}+C(q,\dot{q})+G(q)$, where M, C, and G may all be updated based on estimated payload weight.

The LQR in the PURE system is further optimized to address nonlinearities in the system during agile movement. In one implementation, the EoM may be linearized at a current state of the robot instead of at equilibrium every few samples. In particular, the nonlinearities in the system may be addressed through a gain-scheduling LQR gain. The EoM may be linearized around the current measured state $x_m$ to obtain a new state space model $\dot{x}_m=\overline{A}x_m+\overline{B}u$, where $\overline{A}$ and $\overline{B}$ are time-varying state and input matrices that may be used to obtain the optimal LQR gain.

The description above discloses a ball-balancing mobility assistance vehicle. In one example implementation, the mobility assistance vehicle includes: a spherical ball; a plurality of omniwheels with positioned in contact with an upper hemisphere of the spherical ball to drive the spherical ball; a plurality of motors coupled to the plurality of omniwheels and configured to drive the plurality of omniwheels; a vehicle body comprising a support surface above the spherical ball and a shroud to support the plurality of motors; a load platform detachably coupled with the support surface of the vehicle body; at least one sensor configured to detect a real-time load distribution information on the load platform; and a controller configured to receive the real-time load distribution information and control the plurality of motors based on the real-time load distribution information.

In the implementations above, each of the omniwheels may include a plurality of continuous rollers.

In any one of the implementations above, the controller is configured to set the vehicle in one of a plurality of operation modes including at least one of a park mode, a drive mode, or a neutral mode and wherein each of the plurality of operation modes corresponds to different sets of operation commands for controlling the plurality of motors.

In any one of the implementations above, the controller is configured to detect an operation mode selection among the plurality of operation modes and set a current operation mode of the vehicle accordingly.

In any one of the implementations above, the controller is configured to detect the operation mode selection from a user selection interface or from the real-time load distribution information.

Any one of the implementations above, further includes a landing structure surrounding the spherical ball; and a plurality of extendable arms coupled to the shroud and the landing structure.

In any one of the implementations above, the controller is further configured to electrically engage the plurality of extendable arms to adjust a height position of the landing structure based on a current operation mode among the plurality of operating modes of the vehicle.

In any one of the implementations above, the landing structure includes a ring and a maximum distance of the landing structure above ground as adjusted by the controller and the extendable arms is preset to a value that enables the landing structure to protect the vehicle from tipping.

In any one of the implementations above, the controller is further configured to control the extendable arms to lower the landing structure when the vehicle is in the parking mode.

In any one of the implementations above, the controller is further configured to control the extendable arms to adapt a tilting angle of the landing structure to a floor on which the vehicle parks.

In any one of the implementations above, the controller is further configured to control the extendable arms to keep the landing structure lifted off ground when the vehicle is in the drive mode or the neutral mode.

In any one of the implementations above, the vehicle further includes a plurality of caster wheels attached to the landing structure.

Any one of the implementations above, further includes: when the vehicle is in the drive mode, the controller is further configured to extract a driving command to control the plurality of motors.

In any one of the implementations above, the driving command is extracted from the real-time load distribution information.

In any one of the implementations above, the drive command includes one or any combination of a steering command, a slide command, or a spin command.

In any one of the implementations above, the at least one sensor is further configured to detect surrounding conditions of the vehicle.

In any one of the implementations above, the controller is further configured to extract the drive command based on both the real-time load distribution information and the surrounding conditions.

In any one of the implementations above, the drive mode further includes an autonomous drive mode, and when the vehicle is set in the autonomous drive mode, the controller is further configured to extract the driving command based an electronically stored map, a current location of the vehicle, and the surrounding conditions.

In any one of the implementations above, the controller is further configured to extract balancing information from the real-time load distribution information to control the plurality of motors to stabilize a vertical orientation of the vehicle on a floor.

In any one of the implementations above, the controller is further configured to extract balancing information from the real-time load distribution information to control the plurality of motors to dynamically stabilize a vertical orientation of the vehicle when the vehicle is set in the drive mode.

In any one of the implementations above, the controller is further configured to extract balancing information from the real-time load distribution information to control the plurality of motors to statically stabilize a vertical orientation the vehicle when the vehicle is set in the neutral mode.

In any one of the implementations above, the vehicle further includes a plurality of caster wheels attached to the landing structure, and the controller is further configured to extract balancing information from the real-time load distribution information to control the plurality of motors to statically stabilize a vertical orientation the vehicle when the vehicle is set in the parking mode.

In any one of the implementations above, the at least one sensor is distributed in the load platform.

In any one of the implementations above, each of the plurality of motors includes a quasi-direct-drive brushless DC motor.

In any one of the implementations above, the plurality of omniwheels are configured as pairs of single axis omniwheel plates.

In any one of the implementations above, the load platform may include a seating platform configured to accommodate a seated human, and wherein the load platform is detachably coupled with quick disconnect engagements allowing a human to detach the load platform by hand without the use of tools.

In any one of the implementations above, the vehicle body may further include a shroud covering the support frame, omniwheels and landing structure when in the raised position, the shroud having an upper shoulder apart from and contiguously adjacent to a lower edge of a covering of the load platform.

The description and accompanying drawings above provide specific example embodiments and implementations. Drawings containing device structure and composition, for example, are not necessarily drawn to scale unless specifically indicated. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A ball-balancing mobility assistance vehicle, comprising:
   a spherical ball;
   a plurality of omniwheels positioned in contact with an upper hemisphere of the spherical ball to drive the spherical ball;
   a plurality of motors coupled to the plurality of omniwheels and configured to drive the plurality of omniwheels;
   a vehicle body comprising a support surface above the spherical ball and a motor frame to support the plurality of motors;
   a load platform detachably coupled with the support surface of the vehicle body;
   a plurality of sensors disposed on the load platform and configured to detect a real-time load distribution information on the load platform;
   a controller configured to receive the real-time load distribution information and control the plurality of motors based on the real-time load distribution information;
   a landing structure surrounding the spherical ball; and
   a plurality of extendable arms coupled with the motor frame and the landing structure.

2. The vehicle of claim 1, wherein each of the omniwheels comprises a plurality of rollers arranged contiguously to provide a substantially continuous roller engagement surface around the circumference of the omniwheel.

3. The vehicle of claim 1, wherein the controller is configured to set the vehicle in one of a plurality of operation modes comprising at least one of a park mode, a drive mode, or a neutral mode and wherein each of the plurality of operation modes corresponds to different sets of operation commands for controlling the plurality of motors.

4. The vehicle of claim 3, wherein the controller is configured to detect an operation mode selection among the plurality of operation modes from a user selection interface or from the real-time load distribution information and set a current operation mode of the vehicle accordingly.

5. The vehicle of claim 3, wherein the controller is further configured to electrically engage at least one motor that drives the plurality of extendable arms to adjust a height position of the landing structure relative to the motor frame based on a current operation mode among the plurality of operating modes of the vehicle.

6. The vehicle of claim 5, wherein the landing structure comprises a ring and a maximum distance of the landing structure above ground as adjusted by the controller and the extendable arms is preset to a value that enables the landing structure to protect the vehicle from tipping.

7. The vehicle of claim 5, wherein the controller is further configured to control the extendable arms to lower the landing structure when the vehicle is in the parking mode.

8. The vehicle of claim 7, wherein the controller is further configured to control the extendable arms to adapt a tilting angle of the landing structure to a surface, such as a floor or a ground, on which the vehicle parks.

9. The vehicle of claim 5, wherein the controller is further configured to control the extendable arms to keep the landing structure lifted off the floor or ground when the vehicle is in the drive mode or the neutral mode.

10. The vehicle of claim 1, wherein the vehicle further comprises a plurality of caster wheels attached to the landing structure.

11. The vehicle of claim 3, wherein, when the vehicle is in the drive mode, the controller is further configured to extract a driving command to control the plurality of motors from the real-time load distribution information and/or torso angle information, wherein the drive command comprises one or any combination of a steering command, a slide command, or a spin command.

12. The vehicle of claim 11, wherein the at least one sensor of the plurality of sensors is further configured to detect surrounding conditions of the vehicle and the controller is configured to extract the drive command based additionally on the surrounding conditions.

13. The vehicle of claim 12, wherein the drive mode further comprises an autonomous drive mode, and wherein, when the vehicle is set in the autonomous drive mode, the controller is further configured to extract the driving command based additionally on an electronically stored map, a current location of the vehicle.

14. A ball-balancing mobility assistance vehicle, comprising:
    a spherical ball;
    a plurality of omniwheels positioned in contact with an upper hemisphere of the spherical ball to drive the spherical ball;
    a plurality of motors coupled to the plurality of omniwheels and configured to drive the plurality of omniwheels;
    a vehicle body comprising a support surface above the spherical ball and a motor frame to support the plurality of motors;
    a load platform detachably coupled with the support surface of the vehicle body;
    a plurality of sensors disposed on the load platform and configured to detect a real-time load distribution information on the load platform and;
    a controller configured to receive the real-time load distribution information and control the plurality of motors based on the real-time load distribution information, and further configured to extract balancing information from the real-time load distribution information to control the plurality of motors to stabilize a vertical orientation of the vehicle.

15. The vehicle of claim 3, wherein the controller is further configured to extract balancing information from the real-time load distribution information to control the plurality of motors to statically stabilize a vertical orientation the vehicle when the vehicle is set in the parking mode.

16. The vehicle of claim 3, wherein the at least one sensor is distributed in the load platform.

17. The vehicle of claim 1, wherein each of the plurality of motors comprises a quasi-direct-drive brushless DC motor and the plurality of omniwheels are configured as pairs of single-axis omniwheel plates.

18. The vehicle of claim 1, wherein the load platform comprises a seating platform configured to accommodate a seated human, and wherein the load platform is detachably coupled with quick disconnect engagements allowing a human to detach the load platform by hand without the use of tools.

19. The vehicle of claim 18, wherein the vehicle body further comprises a shroud covering the support frame, the omniwheels and a landing structure when in the raised position, the shroud having an upper shoulder apart from and contiguously adjacent to a lower edge of a covering of the load platform.

* * * * *

UNITED STATES PATENT AND TRADEMARK OFFICE
CERTIFICATE OF CORRECTION

| | |
|---|---|
| PATENT NO. | : 12,048,655 B2 |
| APPLICATION NO. | : 17/464446 |
| DATED | : July 30, 2024 |
| INVENTOR(S) | : Adam Wade Bleakney et al. |

It is certified that error appears in the above-identified patent and that said Letters Patent is hereby corrected as shown below:

In the Specification

In Column 2, Line 34, delete "-65M" and replace with --~65M--.

In Column 10, Line 66, delete "(-1.4" and replace with --(~1.4--.

Signed and Sealed this
Twenty-fifth Day of March, 2025

Coke Morgan Stewart
*Acting Director of the United States Patent and Trademark Office*